Patented June 16, 1942

2,286,226

UNITED STATES PATENT OFFICE 2,286,226

MERCURATED ARYL-ALKYL KETONES

Anderson W. Ralston and Robert J. Vander Wal, Chicago, Ill., assignors to Armour and Company, Chicago, Ill., a corporation of Illinois No Drawing. Application November 4, 1938, Serial No. 238,888

9 Claims. (Cl. 260—434)

This invention relates to mercurated aryl-alkyl ketones and processes of preparing the same.

Organic mercurials are substances of general interest and their use as germicides and antiseptics is well known. Those organic mercurials soluble in organic solvents, such as hydrocarbons, are of particular interest.

We have now discovered a group of organic mercury-containing compounds which are oil soluble and which can be easily prepared from unsaturated aryl-alkyl ketones. These products are characterized by having the structure formula

wherein R' is an aryl radical and R is an aliphatic carbon chain containing the linkage

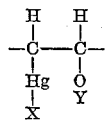

wherein X is an acid radical such as —Cl, —NO$_3$, —OCOCH$_3$, and the like, and Y is hydrogen or an alkyl group containing five or less carbon atoms. These compounds are generally heavy liquids or low melting solids insoluble in water but soluble in organic solvents such as ether, alcohol, kerosene or benzene. They are especially useful as herbicides as we shall presently describe in detail.

The ketones of the present invention can be prepared by reacting an aryl-alkyl ketone wherein the alkyl group contains at least nine carbon atoms and at least one double bond with a mercuric salt in the presence of water or an aliphatic alcohol. By aryl-alkyl ketones we mean ketones in which an aryl (aromatic) group and an alkyl group are each directly attached to the carbonyl group. When the alkyl group contains one double bond, or ethylenic linkage, one atom of mercury enters the molecule to give a ketone containing one linkage of the structure

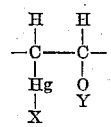

When there are two such double bonds then two of the stated mercury-containing linkages can be introduced into the molecule by using enough reactants to accomplish this. Or, by restricting the amount of reactants, only one such linkage can be introduced leaving another of the double bonds unaffected.

The following are examples of ways of making ketones of the present invention:

EXAMPLE 1

*9-acetoxymercuri, 10-methoxy, 18-p-phenoxyphenyl octadecan-18-one*

43.4 grams of 18-p-phenoxyphenyl 9-octadecene-18 one are placed in a three-necked flask equipped with a stirrer and reflux condenser. 35 grams of mercuric acetate and 100 cc. of methanol are now added and the mixture refluxed for nine hours with constant stirring. 50 cc. of carbon tetrachloride are now added and again refluxed for five hours. The reaction mixture is then cooled and filtered. The solvent is next removed under a vacuum and the oil remaining washed with methyl alcohol until the washings are free from mercury. The product is then dissolved in 100 cc. of carbon tetrachloride, filtered, and the carbon tetrachloride evaporated on a water bath. 20 grams of a heavy, brownish liquid are obtained which analysis shows to be 9-acetoxymercuri, 10-methoxy, 18-p-phenoxyphenyl octadecan-18 one.

EXAMPLE 2

*9-chloromercuri, 10-ethoxy, 18-p-phenoxyphenyl octadecan-18 one*

43.4 grams of 18-p-phenoxyphenyl 9-octadecene-18 one are reacted according to the procedure described under Example 1 with 30 grams of mercuric chloride and 100 cc. of ethanol. The product after purification amounts to 28 grams and consists of a heavy, viscous brown liquid. Analysis shows it to be 9-chloromercuri, 10-ethoxy, 18-p-phenoxyphenyl octadecan-18 one.

EXAMPLE 3

*9-acetoxymercuri, 10-methoxy, 18-xylyl octadecan-18 one*

37 grams of 18-xylyl 9-octadecene-18 one are refluxed with 35 grams of mercuric acetate, 100 cc. of methanol and 50 cc. of carbon tetrachloride for ten hours with constant stirring. The reaction mixture is then cooled and filtered. The solvent is removed under a vacuum and the product washed with water until the washings contain no mercury. The product is then dissolved in ether and dried with anhydrous sodium sulfate. The ether solution is filtered and the ether evaporated. 31 grams of a heavy, straw colored oil are obtained which analysis shows to be 9-acetoxymercuri, 10-methoxy, 18-xylyl octadecan-18 one.

EXAMPLE 4

*1-acetoxymercuri, 2-methoxy, 12-phenyldodecan-12 one*

25.8 grams of 12 phenyl 1-dodecene-12 one are placed in a three-necked flask together with 35 grams of mercuric acetate, 100 cc. of methanol and 50 cc. of carbon tetrachloride. The mixture is refluxed for eight hours with constant stirring. After cooling, the product is filtered and the solvent removed. The product is then washed with water until the washings give no test for mercury. The product is then dissolved in ether and the solution dried. The ether is then evaporated leaving a heavy, straw colored liquid. Analysis shows this to be 1-acetoxymercuri, 2-methoxy, 12-phenyl dodecan-12 one.

EXAMPLE 5

Phenyl-alkyl ketones are prepared by action of benzene and the fatty acid chlorides of linseed oil by a Friedel-Crafts reaction using aluminum chloride as the catalyst. 44 grams of these ketones are then mixed with 35 grams of mercuric acetate, 100 cc. of butyl alcohol and 50 cc. of carbon tetrachloride. The mixture is next heated for ten hours by means of a water bath. The product is then treated as described under Example 3. It consists of a heavy, sticky oil. Analysis indicates it to contain approximately one atom of mercury and one double bond per molecule.

The above examples illustrate the general method of preparing our ketones. Any high molecular weight aryl-alkyl ketone containing one or more double bonds in the alkyl group may be mercurated in the manner above described to give products of our invention. When two double bonds are present in the ketone used it is possible to mercurate either one or both of them, depending upon the relative proportions of the mercuric salt employed. All of the mercurated aryl-alkyl ketones above described are characterized by the presence of the group

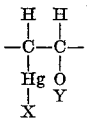

wherein X is an acid radical and Y is hydrogen or an alkyl group containing five or less carbon atoms. The general reaction for their preparation is as follows:

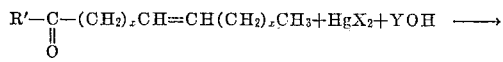

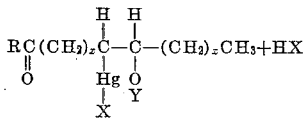

X may be any acid radical and several typical examples have been chosen. Thus X may be

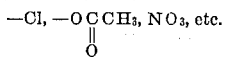

Y may be hydrogen or an alkyl group containing five or less carbon atoms. In the above general reaction R' is an aryl radical. Thus if the reaction is conducted in water the group OY will be hydroxyl and if the reaction is conducted in butyl alcohol the group OY will be butoxy.

These compounds are all insoluble in water but soluble in the usual organic solvents such as ether, alcohol, acetone, kerosene, etc. They show reactions typical of ketones such as the formation of the usual ketone derivatives.

As stated above, these compounds are highly antiseptic and their use as germicides for the preparation of germicidal ointments and paints is indicated. We have further discovered that these mercurated aryl-alkyl ketones are powerful herbicides and that they possess a preferential killing power for weeds in the presence of grass. We have found that it is possible to treat lawns containing weeds with the proper concentration of these mercurated aryl-alkyl ketones so that the weeds are completely removed and the grass is not permanently injured. In order to accomplish this the mercurated ketone is either dissolved in a hydrocarbon solvent, such as kerosene, or emulsified and the solution or emulsion sprayed over the area to be treated. Generally we prefer to use kerosene solutions and we have found that concentrations of the order of 0.5% of the mercurated aryl-alkyl ketone are the most specific in its killing power. Our experimental work shows satisfactory results with concentrations ranging from 0.001% to 1.0%. Where over-all killing of plant growth is desired, higher concentrations may be employed. We have found them to be specific for the removal of weeds having milk- or latex-containing roots, such as those belonging to the family of Compositae which includes thistles, dandelions, sunflowers; or those belonging to the family of Asclepiadaceae which includes milkweeds. We have found them to be especially useful in the control of weeds belonging to the genus Plantago. They are also useful for the eradication and control of the so-called "crab grass," which is a serious lawn pest in most localities. It is our belief that the root system of the weeds being more porous specifically absorb the compounds and that the absorption by the grass roots is of an entirely different order of magnitude so that when controlled amounts are sprayed, essentially all of the mercurial is absorbed by the weed roots.

Having thus described our invention, what we claim is:

1. Mercurated aryl-alkyl ketones containing at least nine carbon atoms in the alkyl chain, said chain having one of the group consisting of hydroxy and alkyloxy containing from one to five carbon atoms attached to one carbon atom and having mercury attached to an adjacent carbon atom and to a monobasic acid radical whose mercuric salt is soluble.

2. Mercurated aryl-alkyl ketones containing eighteen carbon atoms in the alkyl chain, said chain having one of the group consisting of hydroxy and alkyloxy containing from one to five carbon atoms attached to one carbon atom and having mercury attached to an adjacent carbon atom and to a monobasic acid radical whose mercuric salt is soluble.

3. 9-acetoxymercuri, 10-methoxy, 18-p-phenoxyphenyl octadecan-18 one.

4. 9-chloromercuri, 10-ethoxy, 18-p-phenoxyphenyl octadecan-18 one.

5. 9-acetoxymercuri, 10-methoxy, 18-xylyl octadecan-18 one.

6. The process which comprises refluxing a ketone having the formula R'COR, wherein R' is an aryl radical and R is an unsaturated alkyl group having at least nine carbon atoms, with a soluble mercuric salt of a monobasic acid in the presence of an aliphatic alcohol.

7. The process which comprises refluxing a ketone having the formula R'COR, wherein R' is an aryl radical and R is an unsaturated alkyl group having at least nine carbon atoms, with a soluble mercuric salt of a monobasic acid in the presence of an alcohol having not more than five carbon atoms.

8. Ketones as in claim 1 wherein the aryl group is phenyl.

9. Ketones as in claim 1 wherein the aryl group is phenyl.

ANDERSON W. RALSTON.
ROBERT J. VANDER WAL.